Figure 1:
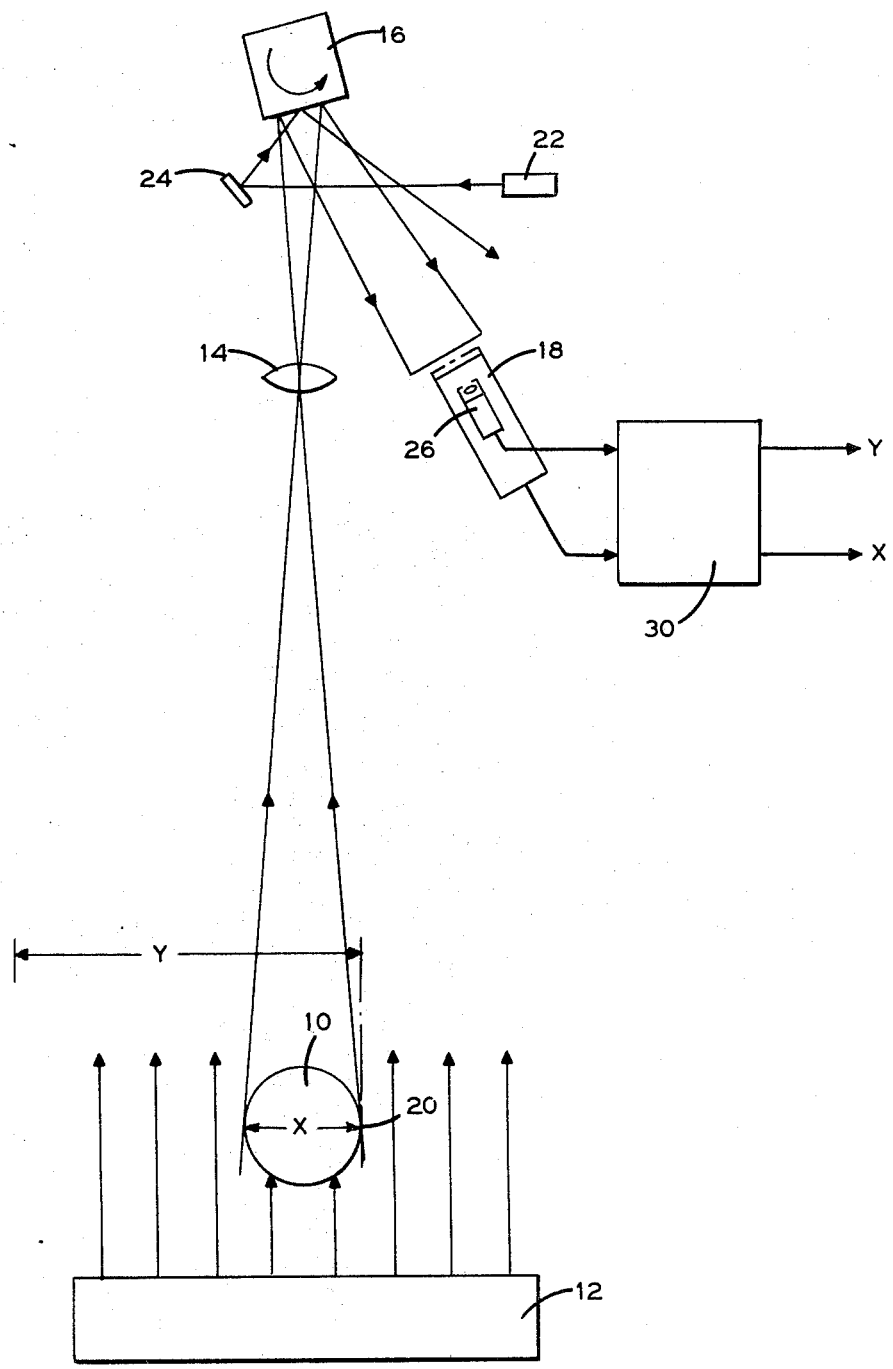

United States Patent
Kubisiak et al.

[11] 3,761,182
[45] Sept. 25, 1973

[54] MEASURING THE DIAMETER OF A CIRCULARLY SHAPED OBJECT AND CORRECTING MEASUREMENT FOR SLIGHT DISPLACEMENTS OF OBJECT ALONG EITHER OF TWO ORTHOGONAL OPTIC AXES

[75] Inventors: Helmut Kubisiak, Leverkusen; Dietrich Sorgenicht, Opladen, both of Germany

[73] Assignee: Exatest Messtechnik GmbH, Leverkusen, Germany

[22] Filed: June 1, 1972

[21] Appl. No.: 258,580

[30] Foreign Application Priority Data
June 4, 1971  Germany............ No. P 21 27 751.0

[52] U.S. Cl.............. 356/160, 356/163, 250/219 R, 250/219 WD, 250/219 S
[51] Int. Cl. .......................................... G01b 11/08
[58] Field of Search................... 356/160, 159, 163, 356/167; 2250/219 R, 219 WD, 219 S

[56] References Cited
UNITED STATES PATENTS
3,658,428   3/1972   Voigtlaender-Tetzner..... 356/160 X
2,999,590   9/1961   Gerhardt......................... 356/160 X FOREIGN PATENTS OR APPLICATIONS
1,150,080   4/1969   Great Britain...................... 356/160

Primary Examiner—David Schonberg
Assistant Examiner—Paul K. Godwin
Attorney—William R. Sherman et al.

[57] ABSTRACT

The disclosed invention involves periodically passing by using an optical scanning device, the profile image of the circular object to be measured before a photodetector which delivers pulses. The duration of each pulse is proportional to the diameter of the object. The improved invention corrects the diameter signal by a position signal giving the variation of the distance between the object and the optical scanning device. The apparatus for implementing such an improved method of measurement mainly comprises two scanning devices, the optical axes of which are orthogonally disposed with respect to each other and with respect to the longitudinal axis of the object, and a correction device is associated with each scanning device for correcting the diameter signal provided by the other scanning device.

7 Claims, 6 Drawing Figures

MEASURING THE DIAMETER OF A CIRCULARLY SHAPED OBJECT AND CORRECTING MEASUREMENT FOR SLIGHT DISPLACEMENTS OF OBJECT ALONG EITHER OF TWO ORTHOGONAL OPTIC AXES

The invention relates to the measurement of the diameter of wire, rod or tubing and the like having a circular cross-section and more particularly to an apparatus and a method for measuring such a diameter by using photoelectric scanning means.

The basic principle of the methods for measuring the diameter of an object having a circular cross-section consists in that by means of a diaphragm-lens system an image of the object is passed periodically before a photodetector which provides pulses in response to illumination jumps, i.e., at the edges of the object. The pulse duration is proportional to the diameter of the object and may then be processed.

In such optical systems the measure ins dependent upon the spacing between the object and the optical system and this spacing cannot be kept constant particularly when the object, such as wire, is moving and oscillating transversally to the movement axis.

The object of the present invention is to provide a method and apparatus for automatically correcting the diameter signal according to the spacing between the object and the optical system.

SUMMARY OF THE INVENTION

The invention resides in a method for measuring the diameter of an object having a circular cross-section in which two electrical signals the durations of which are proportional to the length of two orthogonally disposed diameters are generated. Simultaneously with said two previous-mentioned electrical signals, two other electrical signals defining the position of the object along said orthogonally disposed diameters are also generated. The four electrical signals are then processed to obtain a corrected value of said orthogonally disposed diameters according to the position of said object.

An apparatus for implementing the method of the invention comprises, two optical scanning devices the optical axes of which are orthogonally disposed with respect to each other and with respect to the axis of the object, said optical scanning devices providing elecrical signals the durations of which are proportional to the length of the two orthogonally disposed diameters as well as electrical signals defining a reference point on said orthogonally disposed diameters. The electrical signals delivered by the scanning devices are processed by an electronic device which provides the corrected values of the orthogonally disposed diameters.

Figure 2:
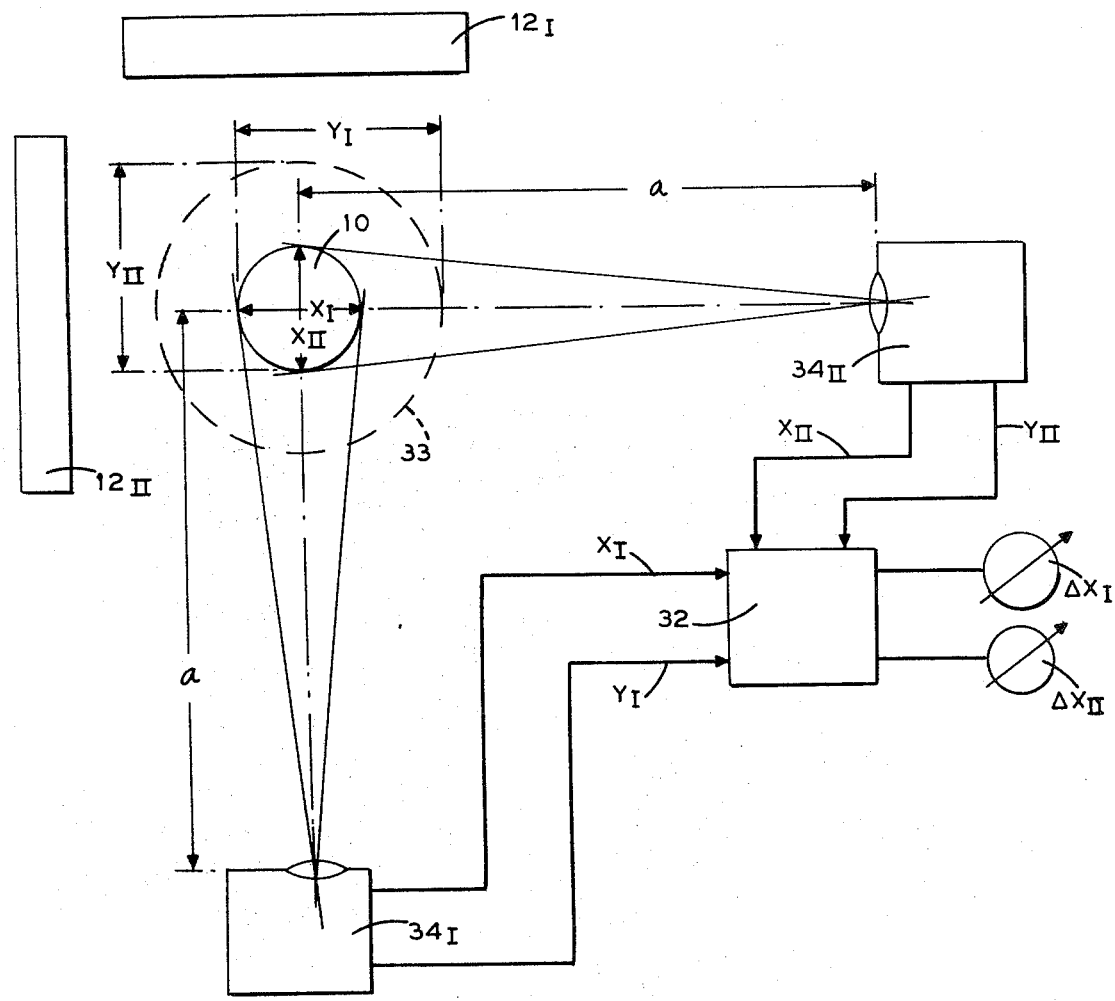
Figure 3:
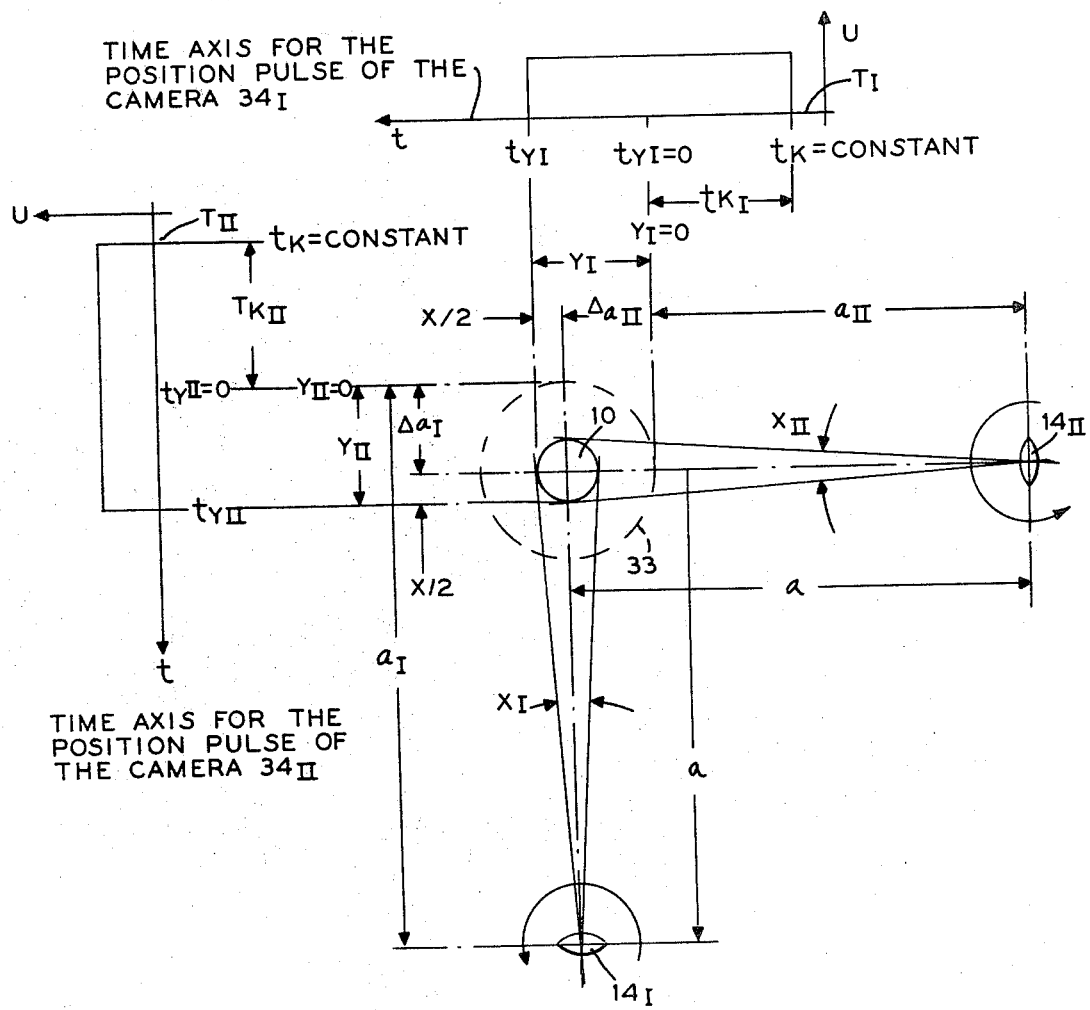
Figure 4:
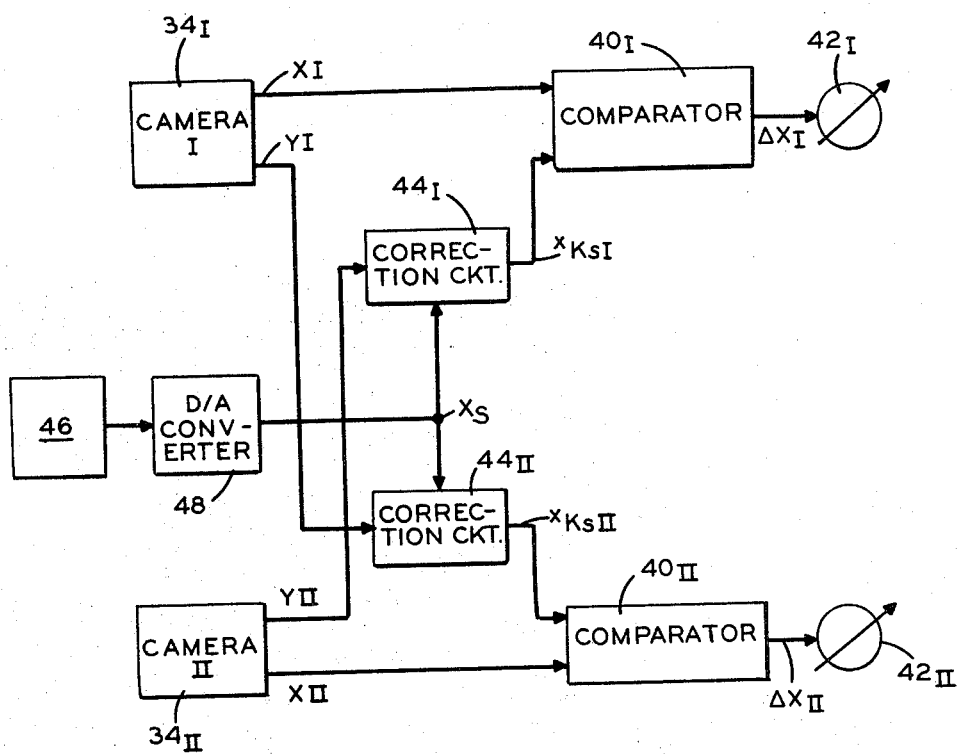
Figure 5:
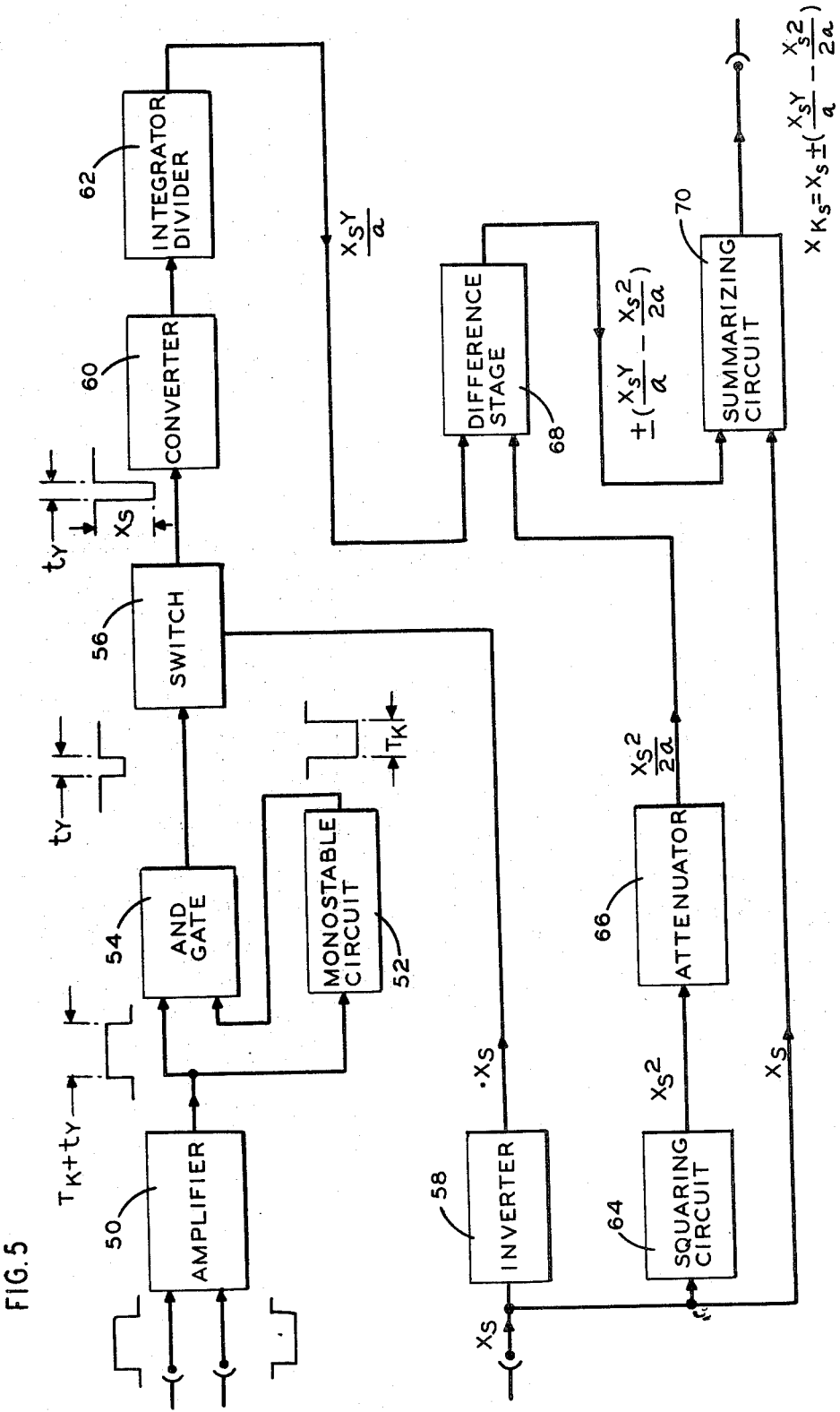
Figure 6:
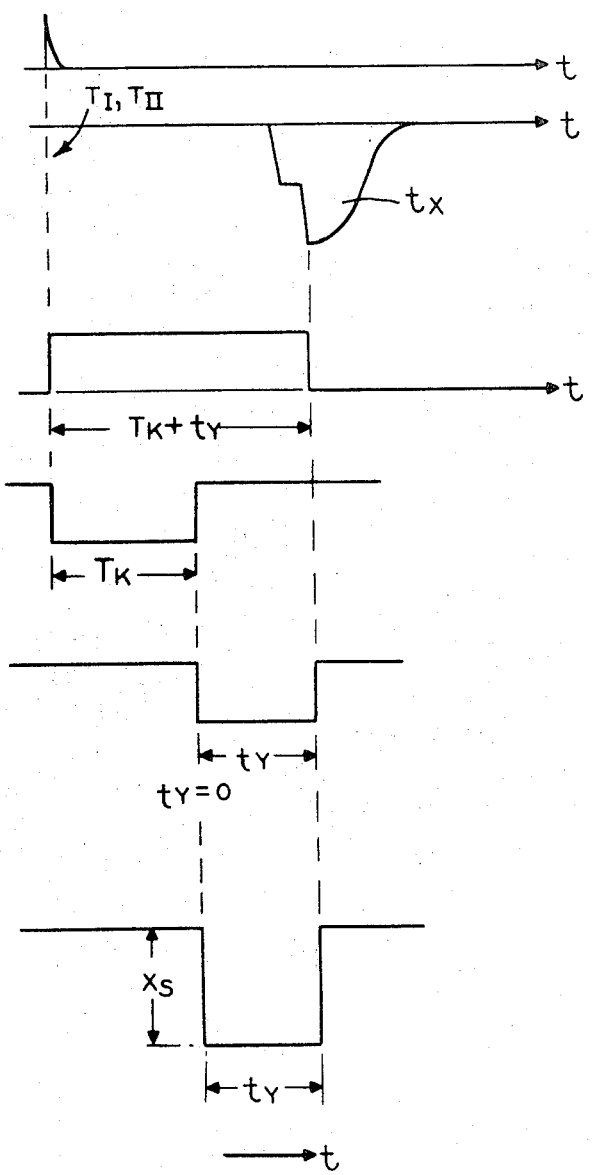

The invention will be explained in detail hereinbelow with reference to the accompanying drawings in which FIG. 1 shows schematically the optical portion of a device for setting up the method according to the invention, FIG. 2 shows the measuring device comprising two cameras, FIG. 3 is a schematic sketch for the purpose of explanation of the correction signal deviation in the device as shown in FIG. 2, FIG. 4 shows the block circuit diagram for processing the signals delivered by the device of FIG. 2, FIG. 5 shows in detail the block diagram of the correction circuit of FIG. 4, FIG. 6 is a pulse diagram related to FIG. 5.

With reference to FIG. 1 a wire 10, the object to be measured is illuminated on one side by a light source 12. A lens system 14 positioned on the other side of the wire 10 is focusing the image of the wire via a mirror face of a revolving polygonal mirror 16 on the cathode plane of a photomultiplier 18. When the mirror 16 is rotating the light of the light-source 12 will illuminate the photocathode which thereafter, beginning with the "edge" 20 of the wire 10 will be shadowed until the light of the light source will become again fully effective. The duration of the pulses at the output of the photomultiplier is proportional to the diameter of the wire 10, other parameters being the distance of the wire from the lens system 14 and the number of rotations of the mirror 16. The principle as well as the means for eliminating the effect of the mirror rotation speed are known.

In addition to the above-described device, there is a light source trigger 22 which provides a light beam directed to the polygonal mirror 24, and reflected therefrom onto a photo-diode 26. The output pulse from the photodiode is a reference corresponding to a certain angular position of the polygonal mirror 16, thus, a "virtual reference value" is provided.

The photomultiplier 18 and the photodiode 26 are connected to electronic circuits shown by the block 30. The output terminals of block 30 supply a diameter pulse X as well as a position pulse Y as it will be explained in detail hereinbelow.

FIG. 2 schematically shows a complete apparatus comprising two light sources $12_I$, $12_{II}$, the wire 10, the cameras $34_I$, $34_{II}$ (each comprising the parts designated in FIG. 1 by 14–18, 22–30) delivering signals $x_I$, $y_I$ and $x_{II}$, $y_{II}$ respectively and further comprising the processing circuit 32 at the output terminals of which the diameter deviations from its standard value will appear. FIG. 2 indicates the so called "oscillation area" 33 of the object, i.e., the area or zone within which the object may move. The oscillation area, of course, is not physically limited but is defined by the pulses delivered by the photodiode 26 which marks a "reference edge." Geometrically the instant of the trigger pulse corresponds to a point on the respective y-coordinate and the time distance $t$ between the front edge signal at the output of the photomultiplier (beginning of the shadow of the wire) and the trigger pulse corresponds geometrically to the length path on the $y_I$ or $y_{II}$ axes, respectively.

According to FIG. 2 the optical axes of the two cameras $34_I$ and $34_{II}$ are disposed orthogonally with respect to each other so that two transversely arranged reference edges are defined. From information contained in the signals $x_I$, $y_I$, $x_{II}$, and $y_{II}$ diameter signals may be derived and corrected with respect to the position of the wire 10 within the entire oscillation area, i.e., the corrected signals are independent of the position of the wire 10.

FIG. 3 is a detailed geometric diagram which shows how the correction is introduced in the processing. Only the wire 10, the lens systems $14_I$ and $14_{II}$ and the geometric values as well as the correlated time axes are shown on FIG. 3.

The measure made by a camera measuring the diameter $x$ of the wire 10 located at a distance $a$ from the lens system is subjected to an error $\Delta x$ which depends upon a distance variation $\Delta a$, the magnitude of said error being given by the equation $$\Delta x = \pm x \Delta a / a \qquad (1)$$

The distance variation $\Delta a$ is detected by means of the second camera disposed transversely with respect to the measuring camera; it may be stated:

$$\Delta a = y - \frac{x}{2} \begin{cases} y_1 = Y_1 - Y_0 \\ y_2 = Y_{11} - Y_{10} \end{cases} \qquad (2)$$

The reduction of $y$ by half the diameter is necessary because $y$ is referenced to the outer edge of the object while the center axis of the object is to be taken as a reference for the position of the width. Thus, the corrected diameter value will be:

$$x_{corr} = x \pm \Delta x = x \pm x/a \, (y - x/2) = x \pm (xy/a - x_2/2a) \qquad (3)$$

In the present emodiment it is not the measured diameter value which will be corrected but the correlated reference or standard valve $x_S$. The corrected standard value $x_{KS}$ will be expressed by:

$$x_{KS} = x_S \pm (x_S y/a - x_S 2/2a) \qquad (4)$$

In order to simplify the processing the design is arranged in such a manner that for each camera, $\Delta a$ will only vary in one direction. From FIG. 3, it comes:

$$x_{KSI} = x_S + (x_S y \, II/a_I + x_S 2/2a_I) \qquad (5)$$

$$x_{KSII} = x_S - (x_{SY} \, I/a_{II} - x_S 2/2a II) \qquad (6)$$

The standard distances $a_I$, $a_{II}$ are respectively defined as the distance to the adjacent border of the oscillation area 33 for camera $34_{II}$ and as the distance to the opposite border of the oscillation area 33 for camera $34_I$.

Since the reflection mirror 24 is rigidly mounted on the cameras 34, a fixed time interval must be provided between the occurrence of the trigger signal and the border of the oscillation area 33 by using electronic circuitry. Hence, in order to provide a pulse duration $t_{yI}$, $t_{yII}$ corresponding to the geometric dimension $y_I$, $y_{II}$ respectively, the position pulse delivered by the camera must be shortened by the constant time interval $T_{kI}$, $T_{kII}$ respectively. This will be understood when looking at FIG. 3 in which the time coordinates are also shown; the trigger pulse occurs at the instant $T_I$ and $T_{II}$, respectively.

The above-defined mathematical operations will be made by the electronic portion of the device. FIG. 4 shows the respective block diagram.

For the sake of clarity, it is assumed that the signal processing is made in an analog manner, but it is clear that digital processing can also be made without departing from the scope of the invention. As usual, the output pulse of the photomultiplier 18 is supplied by the two cameras $34_I$ and $34_{II}$ to the comparator circuits $40_I$ and $40_{II}$ where it is compared with the corrected reference or standard value $x_{KS}$; the difference will be the deviation of the wire diameter which must be measured and will be displayed by the display devices $42_I$ and $42_{II}$. The correction of the standard value is provided by the correction circuits $44_I$ and $44_{II}$ which are supplied each by the position pulse $t_y$ and the non-corrected standard value $x_S$ while at the output thereof the corrected standard value $x_{KS}$ will appear to be supplied to the comparator circuits $40_I$ and $40_{II}$. The standard value $x_S$ at first is given in digital form; it is preselected by a switch 46. However, if this standard value is required in analog form, a digital-to-analog converter 48 is provided, the design of which need not be described in detail because this is not in the scope of the present invention. The correction circuits $44_I$ and $44_{II}$ will be described in detail hereunder with reference to FIGS. 4 and 5.

At the y-input terminal of the circuit the y-pulse is supplied via a line amplifier 50 to the input terminal of a monostable circuit 52.

The y-pulse starts with the trigger pulse $T_I$, $T_{II}$ at the output of the photodiode 26 and stops when the photomultiplier scans the correlated edge (pulse $t_x$). It is now necessary to shorten the pulse by the constant time interval $T_k$ as explained above, the magnitude of $T_k$ is determined by the reset time of the monostable circuit 52 which is adjustable. The y-pulse as well as the output pulse of the monostable circuit 52 are supplied to the inputs of an AND-gate 54 at the output of which a position pulse $t_y$ will appear. The duration of the position pulse $t_y$ corresponds to the deviation of the object with respect to the border of the oscillation area.

In order to provide the product $x_S y$, an electronic switch 56 having its control input terminal connected to the output terminal of the AND-gate 54 and its signal input terminal receiving the inverted standard value $x_S$ (inverter 58) is provided. At the output terminal of the switch 56, a pulse of magnitude $x_S$ and of duration $t_y$ proportional to the distance of the object to the edge of the oscillation area will appear. The integral of these pulses is obtained by means of an impedance converter 60 and an integrator 62. A division by the predetermined denominator is also performed by the integrator 62. At the output of the integrator-divider 62, a signal, the amplitude of which is proportional to the value $x_S y/a$ appears.

The standard diameter $x_S$ is multiplied by itself in a squaring circuit 64 and thereafter the result $x_S$ is divided by $2a$ in an attenuator 66. The signal provided by the attenuator 64 is supplied to the input terminal of the difference stage 68 the other input of which is fed with the signal from the output of the integrator-divider 62. Dependent upon the design of the attenuator 66 which is comprised of an operational amplifier, the output terminal of the attenuator 66 will have a potential having the same or opposite polarity with respect to that of the integrator-divider 62 so that the difference stage 68 may form the sum or the difference thereof (difference for camera $34_I$, sum for camera $34_{II}$). Finally, a summation circuit 70 is provided to form the corrected standard value $x_{KS}$. For the camera $34_I$ the summation circuit 70 is supplied with the output signal of the difference stage 68 with the opposite potential with respect to that of the signal $x_S$ while for camera $34_{II}$ the signals are supplied with the same potential. By proper choice of the time constants it may be achieved that the same time constants are applicable for the variation of the standard value as well as for the measured value.

What is claimed is:

1. A method for measuring the diameter of an object having a circular cross-section comprsing the steps of: simultaneously generating a first electrical signal and duration of which is proportional to the length of one diameter of said object and a second electrical signal the duration of which is proportional to the length of a second diameter of said object orthogonally disposed with respect to the first diameter, simultaneously generating third and fourth electrical signals for defining the position of said object along said first and second diameters, respectively, with respect to a reference position on each diameter, and processing, on the one hand, said first and fourth electrical signals to obtain a value of said first diameter corrected according to the position of said object along said second diameter and, on the other hand, said second and third electrical signals to obtain a value of said second diameter corrected according to the position of said object along said first diameter.

2. An apparatus for measuring the diameter of an object having a circular cross-section comprising identical first and second means orthogonally disposed with each other and with respect to the axis of said object for photoelectrically scanning said object along two orthogonally disposed diameters to detect the transition from non-illumination to illumination whereby obtaining first and second electrical signals respectively the durations of which are proportional to the two orthogonally disposed diameters of said object, identical third and fourth means associated with said first and second means respectively for generating third and fourth electrical signals respectively defining the position of said object along the two orthogonally disposed diameters with respect to a reference point, fifth means for processing said first, second, third and fourth electrical signals to obtain corrected values of the two orthogonally disposed diameters.

3. An apparatus as claimed in claim 2 wherein said identical first and second means each comprises a light source positioned on one side of said object, a photomultiplier device, optical means positioned on the other side of said object for generating a scanning beam from said light source and for sequentially directing said beam to said photomultiplier device.

4. An apparatus as claimed in claim 2 wherein said identical first and second means each comprises a first light source positioned on one side of said object, a photomultiplier device, a rotating mirror positioned on the other side of said object, a lens positioned between said object and said rotating mirror to form an image of said object on the cathode of said photomultiplier device, and wherein said identical third and fourth means each comprises, a photodetector device, a second light source for directing a light beam to said photodetector device by means of said rotating mirror, said light beam being in the same plane as the object beam, and electronic circuits for combining electrical signals provided by said photomultiplier and photodetector devices.

5. An apparatus as claimed in claim 2 wherein said fifth means comprises first and second correction circuits for correcting said first and second electrical signals as a function of the values of said fourth and third electrical signals respectively by solving the correction equation $x_{corr} = x \pm (xy/a - x^2/2a)$ in which $x_{corr}$ is the corrected value of the diameter,
$x$ is the measured value of the diameter,
$a$ is the distance between the object and the lens, and
$y$ is the distance between the reference point and the edge of the object away from said reference point.

6. An apparatus as claimed in claim 2 wherein said fifth means comprises an electronic circuit providing an electrical signal proportional to the standard value of the diameter, first and second correction circuits for correcting said electrical signal proportional to the standard value of the diameter as a function of said fourth and third electrical signals respectively, whereby each correction circuit provides an electrical signal proportional to the corrected standard value of the diameter, first and second comparator circuits for comparing said electrical signal proportional to the corrected standard value of said first and second electrical signals respectively, and first and second display circuits for displaying the deviations of the measured diameter with respect to the corrected standard value.

7. An apparatus as claimed in claim 2 wherein said fifth means comprises an electronic circuit providing an electrical signal proportional to the standard value of the diameter, first and second correction circuits for correcting said electrical signal proportional to the standard value of the diameter as a function of said fourth and third electrical signals respectively, each correction circuit comprising an amplifier circuit receiving said electrical signal defining the position of said object, a gate circuit for providing a position signal shortened by a constant amount, a multiplying circuit for providing an electrical signal having an amplitude proportional to the standard value of the diameter and a duration equal to the shortened position signal, an integrator-divider circuit providing a signal proportional to the area of the output signal of the multiplying circuit, a squaring circuit providing a signal proportional to the square of the standard diameter, a difference stage calculating the difference between the output signals of said integrator-divider circuit and said squaring circuit, and a summation circuit calculating the sum of the signal proportional to the standard diameter and the output signal of said difference stage.

* * * * *